(12) United States Patent
Hagiuda

(10) Patent No.: US 8,145,946 B2
(45) Date of Patent: Mar. 27, 2012

(54) TASK EXECUTION APPARATUS, TASK EXECUTION METHOD, AND STORAGE MEDIUM

(75) Inventor: Tadashi Hagiuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 666 days.

(21) Appl. No.: 12/276,538

(22) Filed: Nov. 24, 2008

(65) Prior Publication Data

US 2009/0165005 A1    Jun. 25, 2009

(30) Foreign Application Priority Data

Dec. 25, 2007    (JP) .................................. 2007-333061

(51) Int. Cl.
*G06F 11/00* (2006.01)
(52) U.S. Cl. ................................ 714/17; 714/18; 714/25
(58) Field of Classification Search .......................... None
See application file for complete search history.

(56) References Cited

U.S. PATENT DOCUMENTS

2003/0061318 A1*   3/2003   Abdelhadi et al. ............ 709/221

FOREIGN PATENT DOCUMENTS

JP          2000-196665         7/2000

* cited by examiner

*Primary Examiner* — Scott Baderman
*Assistant Examiner* — Jason Bryan
(74) *Attorney, Agent, or Firm* — Canon USA Inc. IP Division

(57) ABSTRACT

A task execution apparatus includes an execution unit configured to execute a task on a plurality of devices, an acquisition unit configured to acquire a cause of failure in execution by the execution unit, a confirmation unit configured to confirm that each device of the plurality of devices on which the execution unit failed to execute the task does not support the task based on the cause, and a re-execution unit configured to re-execute the task on each of the plurality of devices on which the execution unit failed to execute the task, wherein the re-execution unit excludes each of the plurality of devices from a re-execution target of the task, in a case where the confirmation unit confirms that each of the plurality of devices does not support the task.

7 Claims, 20 Drawing Sheets

FIG.5

Step1 ▫ ▫ ▫ ▫ ▫
DEVICE SELECTION                                                   [NEXT>] [CANCEL] [?] [«]

SELECT DEVICE TO WHICH DEVICE SETTING IS TO BE TRANSMITTED. SELECT DEVICE, CLICK "ADD TO TARGET DEVICE", AND CLICK "NEXT". CLICK "DISPLAY TARGET DEVICE" WHEN CONFIRMING TARGET DEVICE.

[▦ SELECTABLE DEVICE] [▦ DISPLAY TARGET DEVICE (0)]

DEVICE SELECTION VIEW:   FILTER:
[ ALL DEVICES ▼ ]   [ ▼ ] [DETAIL] [APPLY]   [SET MY FILTER ◂]

ALL DEVICES

[SELECT ALL] [CANCEL ALL]  [↙ ADD TO TARGET DEVICE]        1-10/171 [10 LINES ▼] /1 PAGE 1 2 3 4 5 [▶] [▶|]

| | DEVICE NAME ▲ | PRODUCT NAME ▲ | IP ADDRESS | MAC ADDRESS | DATE AND TIME OF UPDATE |
|---|---|---|---|---|---|
| ☐ | Device001 | ABC Device | 172.24.141.133 | 00:00:85:85:AF:4B | 2007/11/09 18:12:26 |
| ☐ | Device002 | ABC Device | 172.24.156.195 | 00:00:AC:18:9C:C3 | 2007/11/09 18:13:04 |
| ☐ | Device003 | ABC Device | 172.24.156.196 | 00:00:AC:18:9C:C4 | 2007/11/09 18:12:26 |
| ☐ | Device004 | ABC Device | 172.24.156.197 | 00:00:AC:18:9C:C5 | 2007/11/09 18:13:04 |
| ☐ | Device005 | ABC Device | 172.24.156.198 | 00:00:AC:18:9C:C6 | 2007/11/09 18:12:26 |
| ☐ | Device006 | ABC Device | 172.24.156.199 | 00:00:AC:18:9C:C7 | 2007/11/09 18:13:04 |
| ☐ | Device007 | ABC Device | 172.24.156.221 | 00:00:AC:18:9C:DD | 2007/11/09 18:12:26 |
| ☐ | Device008 | ABC Device | 172.24.156.222 | 00:00:AC:18:9C:DE | 2007/11/09 18:13:04 |
| ☐ | Device009 | ABC Device | 172.24.156.223 | 00:00:AC:18:9C:DF | 2007/11/09 18:12:26 |
| ☐ | Device010 | ABC Device | 172.24.156.224 | 00:00:AC:18:9C:E0 | 2007/11/09 18:13:04 |

[|◀]                                                                                                 [NEXT>] [CANCEL] [?]

Step4 ☐☐☐☐☐
DEVICE SETTING EDITING

[<BACK] [NEXT>] [CANCEL] [?]

EDIT DEVICE SETTING TO BE TRANSMITTED. CLICK CHECKBOX OF ITEM TO BE TRANSMITTED AND EDIT SETTING VALUE. CLICK "SET INDIVIDUALLY" AND CLICK "SET" WHEN TRANSMITTING ITEM TO SPECIFIC DEVICE. SETTING WILL BECOME EFFECTIVE AFTER RESTARTING DEVICE WHEN TRANSMITTING SETTINGS OF "TCP/IP PROTOCOL SETTING" AND "DEVICE INFORMATION TRANSMISSION SETTING".

DEVICE INFORMATION ⟵ 700
- ☐ DEVICE NAME
- ☐ INSTALLATION LOCATION
- ☐ ADMINISTRATOR
- ☐ ADMINISTRATOR ADDRESS
- ☐ ADMINISTRATOR COMMENT
- ☐ SERVICE
- ☐ SERVICE ADDRESS
- ☐ SERVICE COMMENT

701

[NEXT>] [CANCEL] [?]

FIG.7

Step5 ☐ ☐ ☐ ☐ ☐
TASK REGISTRATION SETTING   [<BACK] [NEXT>] [CANCEL] [?]

REGISTER NAME AND EXECUTION SCHEDULE OF PRESENT TASK, AND NOTIFYING ADDRESS OF EXECUTION RESULT. SET NECESSARY ITEMS, AND CLICK "NEXT". SELECT "REGISTER ONLY AND NOT EXECUTE (PAUSE)" IN "EXECUTION SCHEDULE" WHEN ONLY REGISTERING TASK AND NOT SETTING SCHEDULE. SETTING WILL BECOME EFFECTIVE AFTER RESTARTING DEVICE WHEN TRANSMITTING SETTINGS OF "TCP/IP PROTOCOL SETTING" AND "DEVICE INFORMATION TRANSMISSION SETTING".

─ 800

TASK SETTING
TASK NAME          [           ] (1 TO 50 CHARACTERS)
COMMENT            [           ] (WITHIN 50 CHARACTERS)

─ 801

SCHEDULE INFORMATION
EXECUTION SCHEDULE  [EXECUTE PERIODICALLY ▼]
EXECUTION CYCLE     [ON WEEKLY BASIS ▼]
              EXECUTION DAY  ☑ MONDAY ☑ TUESDAY ☑ WEDNESDAY ☑ THURSDAY ☑ FRIDAY
                             ☑ SATURDAY ☑ SUNDAY
              EXECUTION
              START TIME     [00 ▼] : [00 ▼]
START OF PERIODICAL  [IMMEDIATELY AFTER REGISTRATION ▼]
EXECUTION

─ 802

EXECUTION RESULT NOTIFICATION
☐ NOTIFY EXECUTION RESULT OF PRESENT TASK
NOTIFYING DESTINATION E-MAIL ADDRESS  [           ]  [ADD]
LANGUAGE OF NOTIFICATION MAIL  [Japanese ▼]

[<BACK] [NEXT>] [CANCEL]
[?]

FIG.8A

| USER ID (500) | USER NAME (501) |
|---|---|
| 111 | XXX |
| 112 | YYY |

FIG.8B

| TASK ID (503) | USER ID (504) | TASK TYPE (505) | TASK NAME (506) | COMMENT (507) | E-MAIL ADDRESS (508) | DATA 1 (510) | DATA 2 (511) | ... |
|---|---|---|---|---|---|---|---|---|
| 01 | 111 | 1 | TRANSMISSION 01 | COMMENT 01 | aaa@co.jp | Value0101 | Value0102 | ... |
| 02 | 111 | 2 | ACQUISITION | COMMENT 02 | bbb@co.jp | NULL | NULL | NULL |
| 03 | 112 | 1 | TRANSMISSION 02 | COMMENT 03 | ccc@co.jp | Value0201 | Value0202 | ... |

FIG.8C

| TASK ID (512) | DEVICE ID (513) |
|---|---|
| 01 | 1000 |
| 01 | 1001 |
| 02 | 1002 |
| 03 | 1000 |
| 03 | 2000 |
| 03 | 2001 |

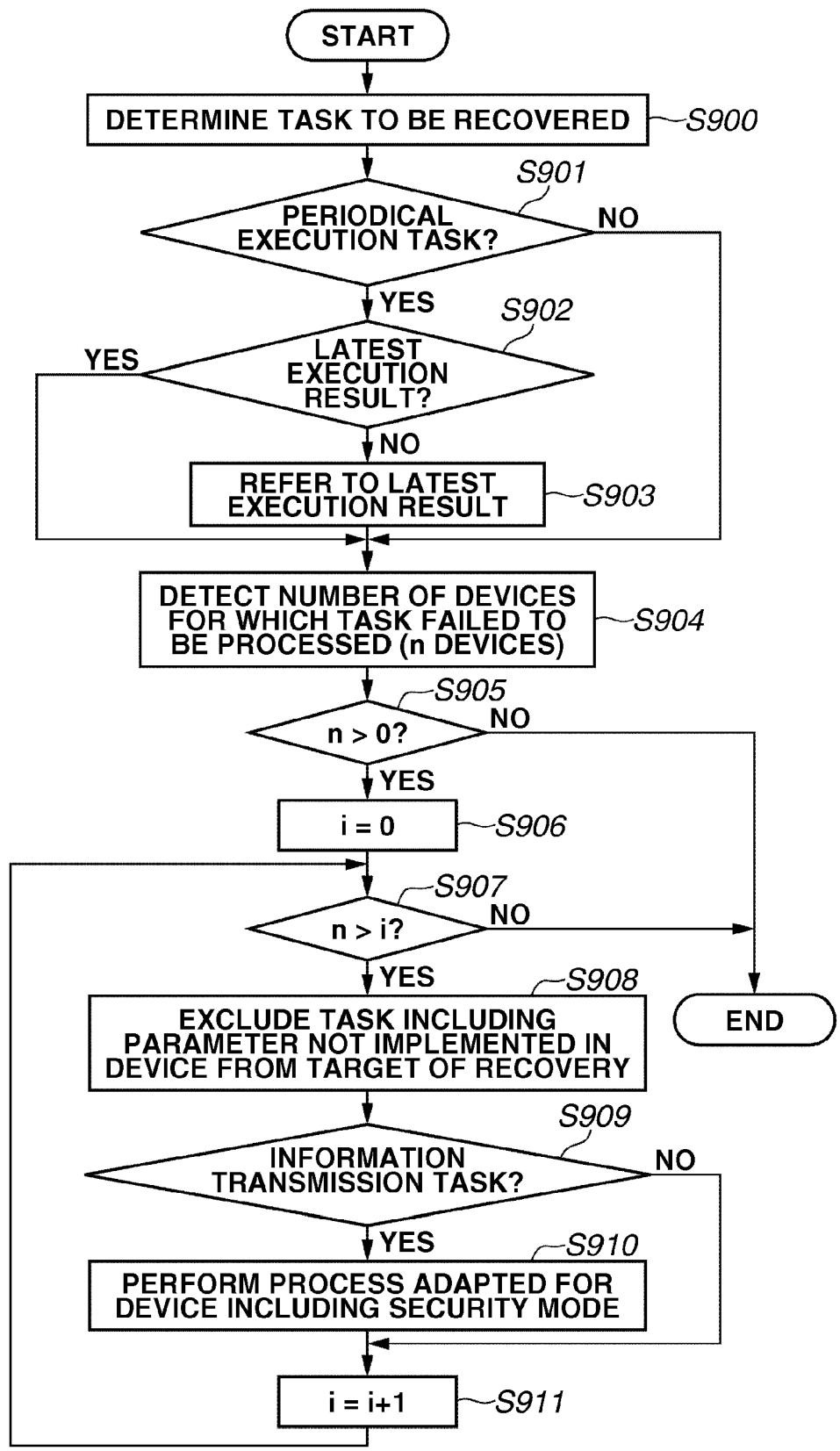

FIG.15

LIST OF REGISTERED TASKS

REGISTRATION CONTENT CAN BE CONFIRMED BY CLICKING TASK NAME. CLICK "EDIT" TO EDIT TASK, AND CLICK "DELETE" TO DELETE TASK.

REGISTERED TASK

1-9/9  10 LINES ▼ /1 PAGE

| TASK NAME | | FUNCTION NAME | REGISTERING PERSON | EXECUTION DATE AND TIME ▼ | STATUS |
|---|---|---|---|---|---|
| Test Task 000 | EDIT>> | DEVICE SETTING ACQUISITION | Administrator | 2007/11/12 9:29:45 | WAITING FOR EXECUTION |
| Test Task 001 | EDIT>> | DEVICE SETTING TRANSMISSION | Administrator | 2007/11/22 8:00:35 | WAITING FOR EXECUTION |
| Test Task 002 | EDIT>> | DEVICE SETTING ACQUISITION | Administrator | 2007/11/22 8:00:35 | WAITING FOR EXECUTION |
| Test Task 003 | EDIT>> | DEVICE SETTING TRANSMISSION | Administrator | 2007/11/22 7:59:35 | EXECUTED |
| Test Task 004 | EDIT>> | DEVICE SETTING TRANSMISSION | Administrator | 2007/11/22 7:59:35 | EXECUTED |
| Test Task 005 | EDIT>> | DEVICE SETTING ACQUISITION | Administrator | 2007/11/22 7:59:35 | EXECUTED |
| Test Task 006 | EDIT>> | DEVICE SETTING ACQUISITION | Administrator | 2007/11/22 7:58:13 | EXECUTED |
| Test Task 007 | EDIT>> | DEVICE SETTING ACQUISITION | Administrator | 2007/11/21 7:54:00 | EXECUTED |
| Test Task 008 | EDIT>> | DEVICE SETTING TRANSMISSION | Administrator | 2007/11/21 7:53:00 | EXECUTED |
| Test Task 009 | EDIT>> | DEVICE SETTING TRANSMISSION | Administrator | 2007/11/18 10:39:00 | EXECUTED |

FIG.16

LIST OF EXECUTED TASKS

UPDATE | MENU | ?

DETAIL OF TASK EXECUTION RESULT CAN BE CONFIRMED BY CLICKING STATUS. CLICK "RECOVERY" TO CREATE RECOVERY TASK OF TASK THAT ENDED IN ERROR.

EXECUTED TASK

1-10/171 | 10 LINES ▼ | /1 PAGE 1 2 3 4 ▶

| TASK NAME | STATUS | | FUNCTION NAME | REGISTERING PERSON | EXECUTION DATE AND TIME ▼ |
|---|---|---|---|---|---|
| Test Task 000 | ERROR | RECOVERY>> | DEVICE SETTING ACQUISITION | Administrator | 2007/11/12 9:29:45 |
| Test Task 001 | NORMAL END | | DEVICE SETTING TRANSMISSION | Administrator | 2007/11/22 8:00:35 |
| Test Task 002 | NORMAL END | | DEVICE SETTING ACQUISITION | Administrator | 2007/11/22 7:59:35 |
| Test Task 003 | ERROR | RECOVERY>> | DEVICE SETTING TRANSMISSION | Administrator | 2007/11/22 7:59:35 |
| Test Task 004 | NORMAL END | | DEVICE SETTING ACQUISITION | Administrator | 2007/11/22 7:59:35 |
| Test Task 005 | NORMAL END | | DEVICE SETTING TRANSMISSION | Administrator | 2007/11/22 7:59:35 |
| Test Task 006 | ERROR | RECOVERY>> | DEVICE SETTING ACQUISITION | Administrator | 2007/11/22 7:58:13 |
| Test Task 007 | CANCELLED | | DEVICE SETTING ACQUISITION | Administrator | 2007/11/21 7:54:00 |
| Test Task 008 | NORMAL END | | DEVICE SETTING ACQUISITION | Administrator | 2007/11/21 7:53:00 |
| Test Task 009 | CANCELLED | | DEVICE SETTING TRANSMISSION | Administrator | 2007/11/18 10:39:00 |

1601  1602  1603  1604  1605

UPDATE | MENU | ?

DETAIL OF EXECUTED TASK                                                    [CLOSE] [?]

'test' ENDED PREMATURELY.

TASK INFORMATION — 1700
| | |
|---|---|
| TASK NAME | test |
| PLUG-IN NAME | DEVICE SETTING INFORMATION |
| COMMENT | |
| REGISTERING PERSON | Administrator |
| EXECUTION START DATE AND TIME | 2007/11/12 9:29:45 |
| EXECUTION END DATE AND TIME | 2007/11/12 9:30:46 |

EXECUTION STATUS OF TARGET DEVICE — 1701

1-10/10  [20 LINES ▼] /1 PAGE — 1702

| DEVICE NAME | STATUS | PRODUCT NAME ▲ | INSTALLATION LOCATION | IP ADDRESS | MAC ADDRESS |
|---|---|---|---|---|---|
| Device001 | NORMAL END | ABC Device | ABC 1F | 172.24.141.133 | 00:00:85:85:AF:4B |
| Device001 | NORMAL END | ABC Device | ABC 1F | 172.24.154.235 | 00:E0:81:34:24:BC |
| Device001 | ERROR | ABC Device | ABC 2F | 172.24.143.166 | 00:00:85:98:F0:0F |
| Device001 | NORMAL END | ABC Device | ABC 2F | 172.24.20.242 | 00:00:85:98:F0:1C |
| Device001 | NORMAL END | ABC Device | ABC 3F | 172.24.154.215 | 00:00:85:87:B0:2A |
| Device001 | NORMAL END | ABC Device | ABC 3F | 172.24.137.76 | 00:00:85:4E:E2:D3 |
| Device001 | NORMAL END | ABC Device | ABC 4F | 172.24.139.86 | 00:00:85:44:06:C3 |
| Device001 | NORMAL END | ABC Device | ABC 4F | 172.24.156.190 | 00:00:AC:18:9C:BE |
| Device001 | NORMAL END | ABC Device | ABC 5F | 172.24.156.191 | 00:00:AC:18:9C:BF |
| Device001 | NORMAL END | ABC Device | ABC 5F | 172.24.156.194 | 00:00:AC:18:9C:C2 |

(1703 — STATUS column)

[CLOSE] [?]

| TASK ID | EXECUTED TASK ID | TASK EXECUTION RESULT | TASK START DATE AND TIME | TASK END DATE AND TIME |
|---|---|---|---|---|
| 01 | 0100 | NORMAL END | 2007/05/04 17:00 | 2007/05/04 18:20 |
| 01 | 0101 | ERROR | 2007/05/05 17:00 | 2007/05/05 18:00 |
| 02 | 0200 | NORMAL END | 2007/07/28 17:00 | 2007/07/28 19:31 |
| 03 | 0300 | EXECUTING | 2007/11/28 02:14 | – |

| EXECUTED TASK ID | DEVICE ID | EXECUTION RESULT OF EACH TASK | DATA 1 | EXECUTION RESULT OF EACH TASK FOR DATA 1 | DATA 2 | EXECUTION RESULT OF EACH TASK FOR DATA 2 | ... |
|---|---|---|---|---|---|---|---|
| 0100 | 1000 | NORMAL END | Value0101 | NORMAL END | Value0102 | NORMAL END | ... |
| 0100 | 1001 | NORMAL END | Value0101 | NORMAL END | Value0102 | NORMAL END | ... |
| 0101 | 1000 | NORMAL END | Value0101 | NORMAL END | Value0102 | NORMAL END | ... |
| 0101 | 1001 | ERROR | NOT IMPLEMENTED | ERROR | Value0102 | NORMAL END | ... |
| 0200 | 1002 | NORMAL END | Value0101 | NORMAL END | Value0102 | NORMAL END | ... |
| 0300 | 1000 | NORMAL END | Value0201 | NORMAL END | Value0202 | NORMAL END | ... |
| 0300 | 2000 | NORMAL END | Value0201 | NORMAL END | Value0202 | NORMAL END | ... |
| 0300 | 2001 | NOT EXECUTED | NULL | NOT EXECUTED | 2001 | NOT EXECUTED | ... |

FIG.20

| LEVEL | SNMPv1 | SNMPv3 |
|---|---|---|
| HIGH | Disable | Read/Write |
| MID | ReadOnly | Read/Write |
| LOW | Read/Write | Read/Write |

TASK EXECUTION APPARATUS, TASK EXECUTION METHOD, AND STORAGE MEDIUM

BACKGROUND OF THE INVENTION

1. Field of the Invention

The present invention relates to a task execution apparatus, a task execution method, and a storage medium. In particular, the present invention relates to a task execution apparatus that can collectively execute a task on a plurality of devices.

2. Description of the Related Art

In recent years, various peripheral devices such as a computer and a printer are interconnected via a local area network (LAN) so that users can share assets of these devices. In such a network environment, a computer that is referred to as a server, is provided to collectively handle requests from host computers. In a case of a network including printers, a printer server is provided to collectively manage print requests from a plurality of host computers. The printer server is a computer that provides services shared by a plurality of printers to clients and includes a function to set or change a printer operation according to a request from a client.

Before the introduction of the printer server, a user could confirm an operation status of the printer only by referring to an operation panel of the printer. However, the printer which is shared by a plurality of users is not necessarily placed near a computer operated by the user. Further, the operation panel of the printer generally displays a limited amount of information or includes a small area for displaying information. Therefore, it is difficult for the user to correctly determine the status of the printer from the operation panel of the printer.

In order to solve such a problem, there is a network device management program that can monitor an operation of a device connected to a network (refer to Japanese patent Application Laid-Open NO. 2000-196665). An example of a network device management program is software that runs on a computer operated by a user. The software allows the user to confirm a state of an operation panel of a printer from the computer screen and notifies the user when there is a printer failure.

However, in such a case, the software needs to be installed in each computer. As a result, in a case where a network administrator collectively manages a plurality of user's computers, much time is taken to manage versions of software.

Consequently, a network device management program which can be installed in a world wide web (WWW) server to integrally manage devices that are located at remote work areas is discussed. The network device management program based on a WWW system can include functions that collectively acquires and transmits information from and to a plurality of devices managed by the network device management program. Further, if the network device management program having the function that can collectively transmit information to the plurality of devices fails to execute the process on some of devices, the network management program can re-execute the process at a given timing.

However, there are problems as will be described below in a case where a conventional network device management program re-executes the process that has failed.

The conventional network device management program can arbitrarily select a plurality of devices, so that the network device management program may transmit device-dependant information to devices. In such a case, the device which has received information that does not support the device always fails in re-executing the process.

Further, recent devices include a mode in which information can only be acquired (read) from the device and not transmitted to (written in) the device, in consideration of security (hereinafter referred to as a security mode). Consequently, since the information can be acquired from the device, the device makes a response when the network device management program searches for the device. However, the network device management program cannot transmit information to the device, so that re-execution of a transmission process to the device always fails.

Further, the conventional device management program can periodically execute the transmission process on the device according to a preset schedule. However, an execution result is different for each cycle in such a network device management program. Therefore, a re-execution process is not effective if information for the re-execution process is generated based on the execution result for each cycle.

SUMMARY OF THE INVENTION

According to an aspect of the present invention, a task execution apparatus communicates with a device and executes a task to perform remote control of the device. The task execution apparatus includes an execution unit configured to execute the task on a plurality of devices, an acquisition unit configured to acquire a cause of failure in execution by the execution unit, a confirmation unit configured to confirm that each device of the plurality of devices on which the execution unit failed to execute the task does not support the task executed by the execution unit based on the cause acquired by the acquisition unit, and a re-execution unit configured to re-execute the task on each of the plurality of devices on which the execution unit failed to execute the task, wherein the re-execution unit excludes each of the plurality of devices from a re-execution target of the task, in a case where the confirmation unit confirms that each of the plurality of devices does not support the task executed by the execution unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates an example of a device selection screen according to the exemplary embodiment of the present invention.

FIG. 6 illustrates an example of a device setting editing screen according to the exemplary embodiment of the present invention.

FIG. 7 illustrates an example of a task registration setting screen according to the exemplary embodiment of the present invention.

FIGS. 8A, 8B, and 8C illustrate examples of data tables which are generated by a network device management program when a task is registered according to the exemplary embodiment of the present invention.

FIG. 9 is a flowchart illustrating an example of an operation performed by a device management program when a recovery task for re-executing a task that failed in transmission is generated according to the exemplary embodiment of the present invention.

FIG. 15 illustrates an example of a registered task list screen according to the exemplary embodiment of the present invention.

FIG. 16 illustrates an example of an executed task list screen according to the exemplary embodiment of the present invention.

FIG. 17 illustrates an example of an executed task details screen according to the exemplary embodiment of the present invention.

FIG. 19 illustrates an example of data tables which are generated by a network device management program when a task is executed according to the exemplary embodiment of the present invention.

FIG. 20 illustrates an example of a specification of a security mode device according to the exemplary embodiment of the present invention.

DETAILED DESCRIPTION OF THE EMBODIMENTS

Various exemplary embodiments, features, and aspects of the invention will be described in detail below with reference to the drawings.

In an exemplary embodiment of the present invention, a task is a unit of a process that includes a target device which is a target for transmitting or acquiring information, the information to be transmitted to (or acquired from) the device, and an execution schedule. Further, a recovery task is a task which is re-executed to the target device on which the execution of the task has failed.

Figure 1:
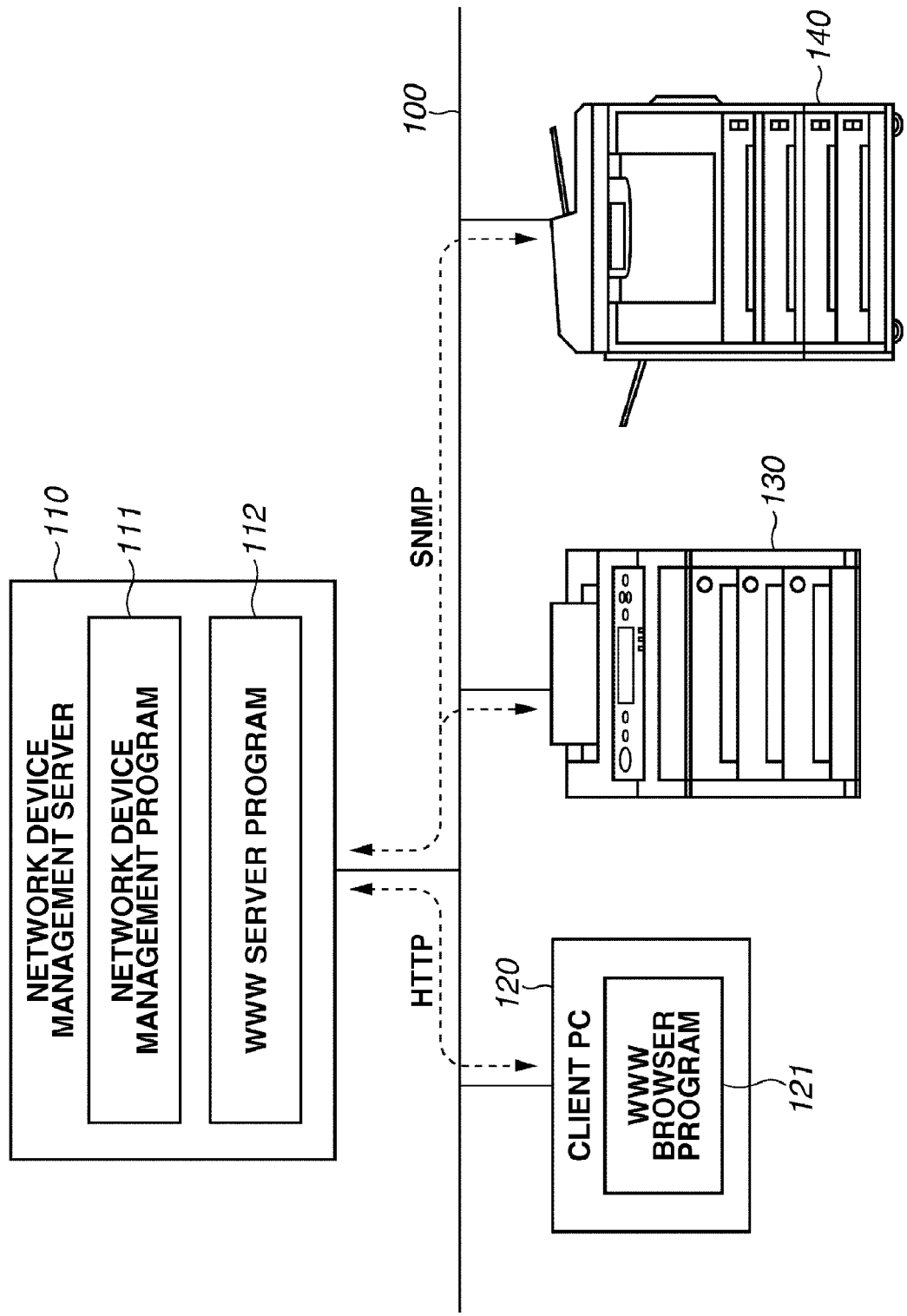
FIG. 1 illustrates an example of a configuration of a network device management system according to an exemplary embodiment of the present invention.

FIG. 1 illustrates an example of a configuration of a network device management system including a network device management program according to the exemplary embodiment of the present invention.

Referring to FIG. 1, a network device management server 110, a client personal computer (PC) 120, a printer 130, and a multifunctional device 140 are connected to a LAN 100. The network device management server 110 is an example of a task execution apparatus. The network device management server 110 communicates with the printer 130 which is an example of a device. The network device management server 110 performs remote control of the printer 130 via a network by executing various tasks.

A network device management program 111 and a WWW server program 112 are installed in the network device management server 110. A WWW browser program 121 is installed in the client PC 120.

The printer 130 and the multifunctional device 140 are management targets of the network device management server 110. A user accesses the network device management server 110 by operating the client PC 120.

The network device management program 111 communicates with the printer 130 and the multifunctional device 140 using a simple network management protocol (SNMP). On the other hand, the WWW browser program 121 installed in the client PC 120 communicates with the network device management program 111 using a hypertext transfer protocol (HTTP).

Hereinafter, the network device management server 110 is referred to as a device management server 110, and the network device management program 111 will be referred to as a device management program 111. Further, the printer 130 and the multifunctional device 140 will be referred to as devices, as necessary.

Figure 2:
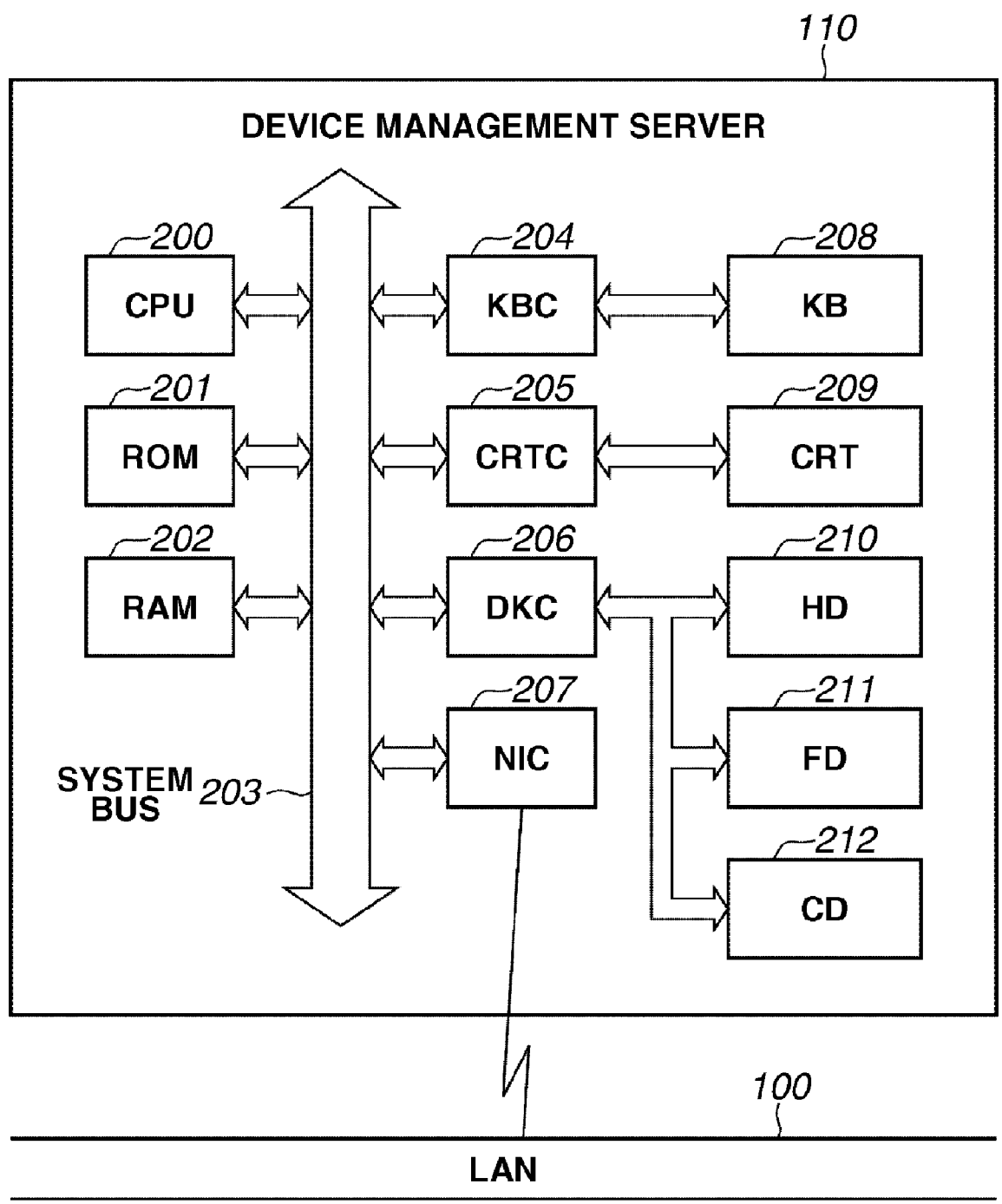
FIG. 2 illustrates an example of a hardware configuration of a network device management server according to the exemplary embodiment of the present invention.

FIG. 2 illustrates an example of a hardware configuration of the device management server 110 on which the device management program 111 can be executed. In the present exemplary embodiment, the device management server 110 can be realized by a PC.

The device management server 110 includes a central processing unit (CPU) 200 that executes the device management program 111 stored in a read-only memory (ROM) 201 or a hard disk (HD) 210. The CPU 200 exercises control over each device connected to a system bus 203. A random access memory (RAM) 202 functions as a main memory and a work area of the CPU 200.

A keyboard controller (KBC) 204 controls input of instruction from a keyboard (KB) 208 and a pointing device (not illustrated). A cathode-ray tube controller (CRTC) 205 controls a display of a display (CRT) 209.

A disk controller (DKC) 206 controls access to a hard disk (HD) 210, a flexible disk (FD) 211, and a compact disk (CD)-ROM drive 212.

A network interface card (NIC) 207 bi-directionally transmits and receives data to and from the client PC 120, the printer 130, and the multifunctional device 140 via the LAN 100.

An example of a configuration of the device management program 111 will be described below. Hereinafter, unless otherwise stated, the CPU 200 is the main hardware for executing a process. On the other hand, the device management program 111 stored in the HD 210 is the main software that executes control. Further, the present exemplary embodiment uses a Windows operating system (OS). However, the OS is not limited to the Windows OS.

Further, the device management program 111 can be stored in a storage medium such as a CD-ROM and supplied to the device management server 110. In such a case, the CD-ROM drive 212 reads the device management program 111 from the storage medium such as a CD-ROM and installs the device management program 111 in the HD 210.

Figure 3:
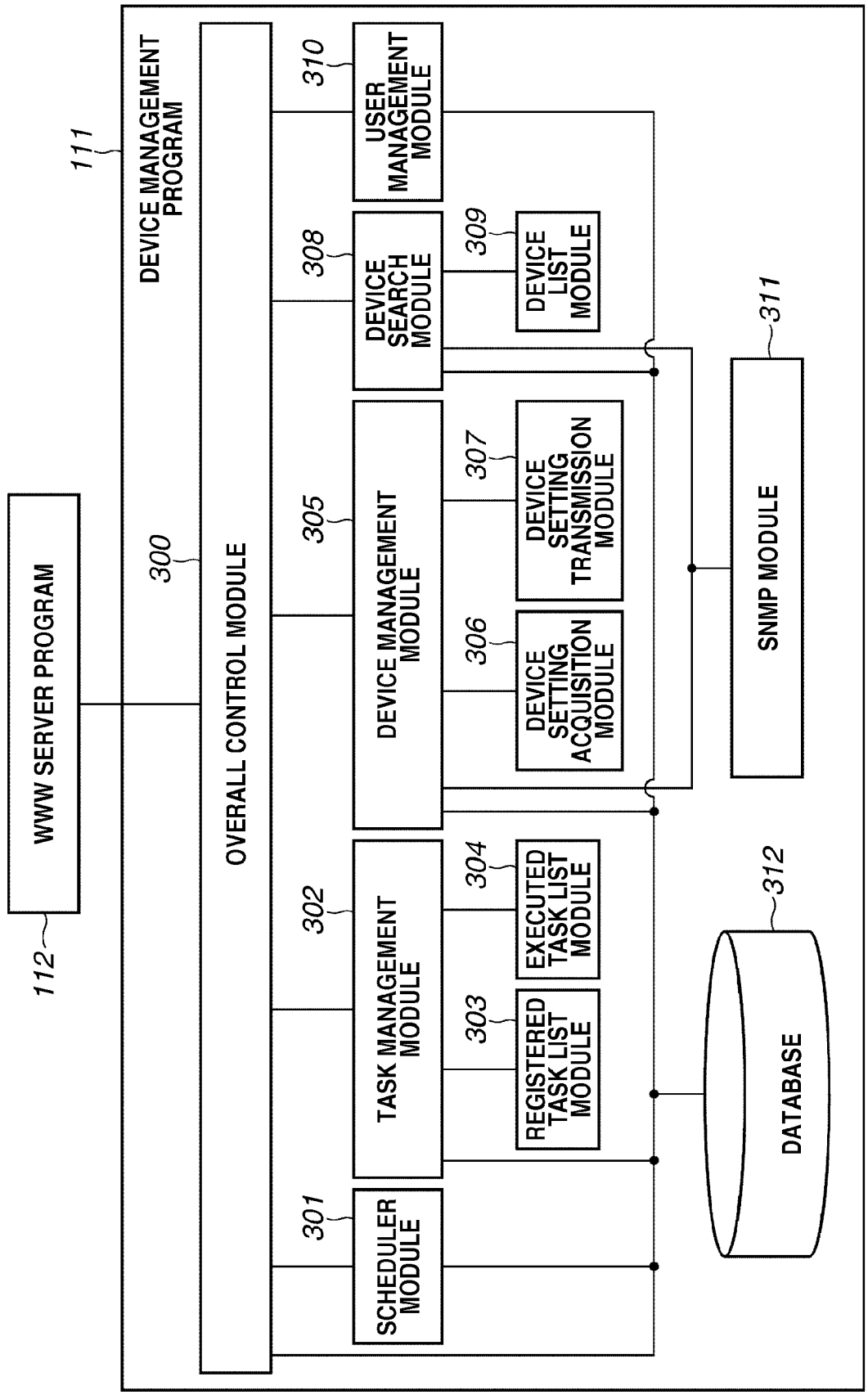
FIG. 3 is an example of a configuration of network device management program modules according to the exemplary embodiment of the present invention.

FIG. 3 illustrates an example of a configuration of modules included in the device management program 111 that operate on the device management server 110.

As described above with reference to FIG. 1, the device management program 111 operates on the WWW server program 112 and communicates with the WWW browser program 121 in the client PC 120 using HTTP. On the other hand, the device management program 111 communicates with the printer 130 and the multifunctional device 140 using SNMP.

Referring to FIG. 3, an overall control module 300 of the device management program 111 analyzes a command received from the WWW server program 112. The overall control module 300 then allocates control to a scheduler module 301, a task management module 302, a device management module 305, a device search module 308, and a user management module 310 according to a result of analyzing the command. Further, the overall control module 300 transmits hyper text markup language (HTML) data generated in the scheduler module 301, the task management module 302, the device management module 305, the device search module 308, and the user management module 310 to the WWW server program 112.

The scheduler module 301 activates and terminates a task which is a unit of a process that can be registered in the device management program 111, according to a user setting.

The task management module 302 controls registration, editing, and deletion of the task, and manages a task status. Further, the task management module 302 displays a list of the tasks that are registered by a registered task list module 303. Further, the task management module 302 displays a list of execution status of the tasks that are executed by an executed task list module 304.

The device management module 305 generates a task to acquire information from a device that is a management target, or to make a setting of the management target device, and controls displaying of a user interface (UI) related to generation of the task. Further, the device management module 305 controls a device setting acquisition module 306 to generate a task which acquires the information from the device. Further, the device management module 305 controls a device setting transmission module 307 to generate a task which transmits the information to the device.

The device search module 308 generates a task which searches for a device connected to the network such as the LAN 100, and controls displaying of a UI related to generation of the task. The device search module 308 controls a device list module 309 and displays a device list of searched devices to update information and delete a device.

The user management module 310 registers, edits, and deletes information about a user who can access the device management program 111.

An SNMP module 311 transmits an SNMP command by instruction from the device management module 305 and the device search module 308 and receives a response from a device using SNMP.

A database 312 stores various task information, user information, and system information necessary for the device management program 111 to operate. Details on information about data tables which are created when a task is generated and executed will be described below.

Figure 4:
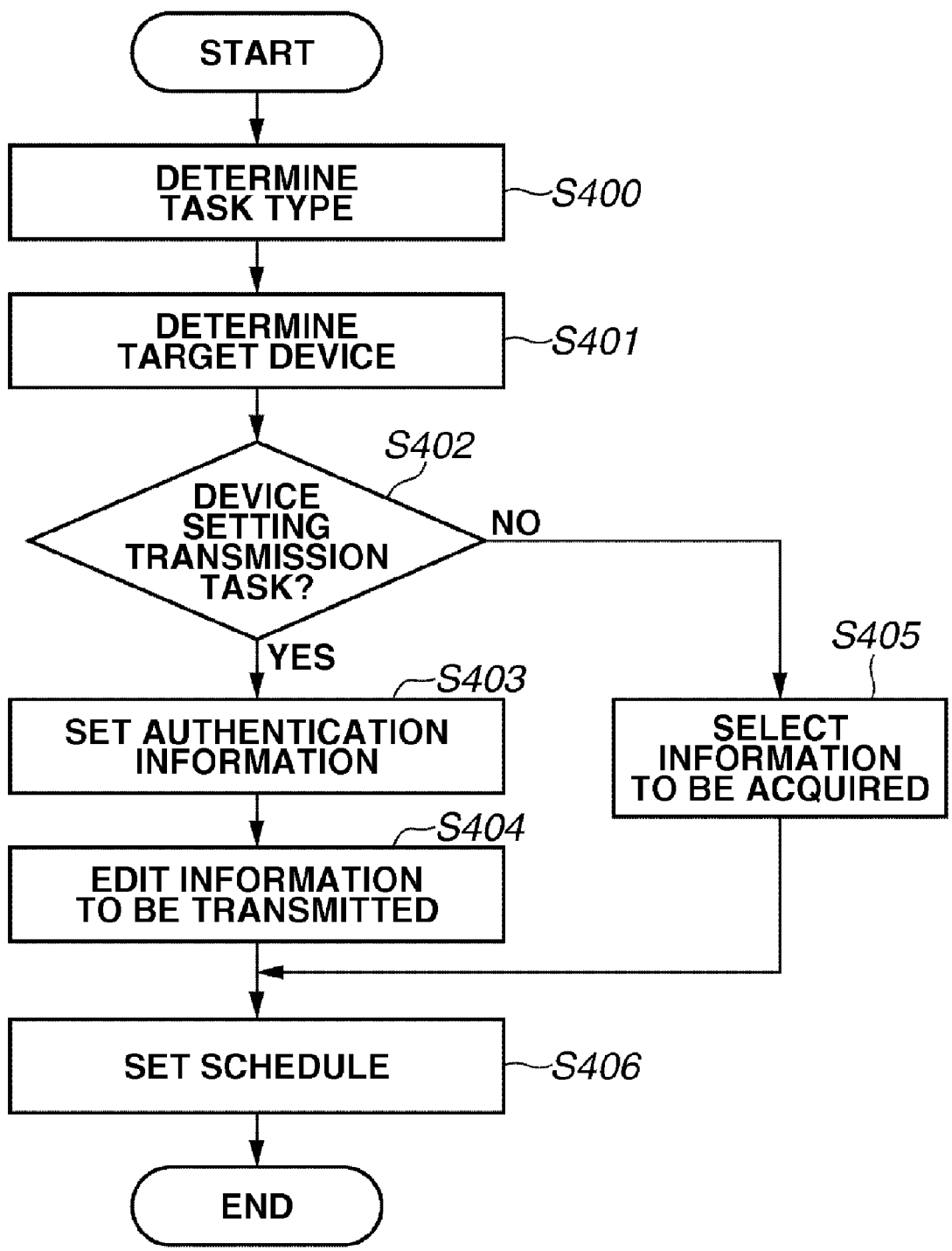
FIG. 4 is a flowchart illustrating an example of an operation performed by a network device management program when a task that manages a device is generated according to the exemplary embodiment of the present invention.

FIG. 4 is a flowchart illustrating an example of an operation performed by the device management program 111 when a task that manages a device is generated.

In step S400, the device management module 305 determines a type of the task to be generated based on a user operation. The process then proceeds to step S401.

In the present exemplary embodiment, the user can select either one of a task which transmits information to the device (hereinafter referred to as a device setting transmission task), or which acquires the information from the device (hereinafter referred to as a device setting acquisition task).

When the device management module 305 determines that the device setting transmission task is to be generated in step S400, the task is generated in the device setting transmission module 307 via the device management module 305. On the other hand, when the device management module 305 determines that the device setting acquisition task is to be generated in step S400, the task is generated in the device setting acquisition module 306 via the device management module 305.

In step S401, the device management module 305 arbitrarily determines a target device from devices searched by the device search module 308 and stored in the database 312 based on the user operation. The process then proceeds to step S402.

FIG. 5 illustrates an example of a device selection screen used by the user to select the device described in step S401 illustrated in FIG. 4. The device selection screen is displayed by an operation performed by the device management program 111.

Referring to FIG. 5, a target device list display portion 600 displays a list of information about selection target devices that are searched by the device search module 308 and stored in the database 312. More specifically, the target device list display portion 600 displays a device name, a product name, an Internet protocol (IP) address, and a media access control (MAC) address of a selection target device, and date and time the device information was updated. The user can arbitrarily select a plurality of devices by checking device selection check boxes 601.

In step S402 illustrated in FIG. 4, the device management module 305 determines whether the task determined in step S400 is the device setting transmission task. If the task is the device setting transmission task (YES in step S402), the process proceeds to step S403. On the other hand, if the task is the device setting acquisition task instead of the device setting transmission task (NO in step S402), the process proceeds to step S405.

In step S403, the device management module 305 sets authentication information to the device which is necessary for transmitting information to the device. The process then proceeds to step S404.

In step S404, the device setting transmission module 307 edits the information to be transmitted to the device. The process proceeds to step S406.

FIG. 6 illustrates an example of a device setting editing screen. The device setting editing screen is used by the user to edit the information to be transmitted to the device in step S404 illustrated in FIG. 4. The device setting editing screen is displayed by an operation performed by the device management program 111.

Referring to FIG. 6, the user can input the information to be transmitted to the device in a transmission information input portion 700. The information includes a device name, an installation location, an administrator name, an administrator address, an administrator comment, a service name, a service address, and a service comment. The user can select the information to be transmitted to the device by checking information selection check boxes 701.

Returning to FIG. 4, in step S405, the device setting acquisition module 306 selects the information to be acquired from the device. The process proceeds to step S406.

In step S406, the scheduler module 301 sets an execution schedule for transmitting information edited in steps S403 and S404, or for acquiring information selected in step S405. The process then ends.

FIG. 7 illustrates an example of a task registration setting screen. The task registration setting screen is used by the user to set information necessary in registering the task, such as setting the schedule described in step S406 illustrated in FIG. 4. The task registration setting screen is displayed by an operation performed by the device management program 111.

Referring to FIG. 7, the user can set an arbitrary character string as a task name in a task setting input portion 800. Further, the user can input a comment on the task in the task setting input portion 800.

The user can set the execution schedule for executing the task in a schedule setting portion 801. In addition to setting a predetermined date and time to the execution schedule, the user can set a periodical execution in which a registered task is repeatedly executed in the device management program 111 according to the present exemplary embodiment.

The user can further input an e-mail address in an execution-result-notifying destination input portion 802 for notifying a task completion. In the present exemplary embodiment, the device management program 111 notifies a destination designated by the execution-result-notifying-destination input portion 802, of an execution result of the task when the task is completed.

The task generated in the flowchart illustrated in FIG. 4 is registered in a registered task list by the registered task list module 303 via the task management module 302. Further, the registered task is activated from the scheduler module 301 according to the execution schedule set in step S406, and added to the executed task list by the executed task list module 304. Further, when the task is completed, the task is stored in the database 312 by the task management module 302 via the executed task list module 304.

FIGS. 8A, 8B, and 8C illustrate examples of data tables which are generated by the device management program 111 when the task is registered.

FIG. 8A illustrates an example of a user management table generated by the user management module 310. The user management table includes a user identification (ID) 500 and a user name 501. An arbitrary character string input by the user is described in the user name 501, and an identifier assigned by the user management module 310 is described in the user ID 500.

FIG. 8B illustrates an example of a registered task table. The device management program 111 generates the registered task table based on the user operation on UIs generated by the device setting acquisition module 306 and the device setting transmission module 307.

In the registered task table illustrated in FIG. 8B, a task ID 503 is an identifier assigned by the task management module 302 to a task generated by the device setting acquisition module 306 or by the device setting transmission module 307.

In a user ID 504, a user ID of the user who generates the task is registered from among the user ID 500 registered in the user management table illustrated in FIG. 8A.

In a task type 505, an identifier according to a type of the generated task (i.e., "1" for device setting transmission, and "2" for device setting acquisition) is set.

In a task name 506, a character string that the user inputs as a task name in the task setting input portion 800 illustrated in FIG. 7 is registered. Further, in a comment 507, a character string that the user inputs as a comment about the task in the task setting input portion 800 is registered. Further, in an e-mail address 508, an e-mail address for notifying of a task execution result that the user inputs in the execution-result-notifying-destination input portion 802 illustrated in FIG. 7 is registered.

In "data 1" 510 and "data 2" 511, values that the user inputs in the device setting editing screen illustrated in FIG. 6 and set to the device by executing the task are registered. When the task is the device setting acquisition task, the device management program 111 registers "null" as values of "data 1" 510 and "data 2" 511.

FIG. 8C illustrates an example of a target device management table that manages the target devices of each task selected by the user on the device selection screen illustrated in FIG. 5.

In the target device management table illustrated in FIG. 8C, values registered in a task ID 512 correspond to values in the task ID 503 in the registered task table illustrated in FIG. 8B.

A device ID 513 is a device identifier for identifying a device that is selected on the device selection screen illustrated in FIG. 5 when the task is generated. In the example illustrated in FIG. 8C, the devices that are identified by device IDs "1000" and "1001" are selected as the target devices of the task which is assigned the task ID "01". That is, the task is collectively executed on the devices identified by the device IDs "1000" and "1001".

FIG. 9 is a flowchart illustrating an example of an operation performed by the device management program 111 when a recovery task for re-executing a task that failed to transmit the information to the device is generated.

In step S900, the device management module 305 determines a task to be recovered based on a user operation. More specifically, the user presses a "recovery>>" link of an arbitrary task on an executed task list screen illustrated in FIG. 16 (to be described below). As a result, the task to be recovered is selected, and the process proceeds to step S901.

In step S901, the device management module 305 determines whether the task determined in step S900 is a periodical execution task that is periodically repeated. If the task is the periodical execution task (YES in step S901), the process proceeds to step S902. On the other hand, if the task is not the periodical execution task (NO in step S901), the process proceeds to step S904.

In step S902, the device management module 305 determines whether the execution result of the task determined to be the periodical execution task in step S901 is a latest periodical execution task. When the execution result of the task is the latest execution result (YES in step S902), the process proceeds to step S904. When the execution result is not the latest execution result (NO in step S902), the process proceeds to step S903.

In step S903, the device management module 305 refers to the execution result of the latest periodical execution task. The process then proceeds to step S904.

In step S904, the device management module 305 refers to the execution result of the task determined in step S900 or the execution result of the task referred in step S903. The device management module 305 then detects a number of devices on which the task failed to be processed (as n devices) and stores the detected number of devices.

In step S905, the device management module 305 determines whether one or more devices were detected in S904 on which the task failed to be processed. If there is one or more of the device (YES in step S905), the process proceeds to step S906. On the other hand, if there is no device on which the task failed to be processed (NO in step S905), the process ends.

In step S906, the device management module 305 initializes an index i for counting the device on which the task failed to be processed, to zero. The process proceeds to step S907.

In step S907, the device management module 305 determines whether the index i is less than n, i.e., the number of devices on which the task failed to be processed. When the index i is less than the number of devices n (YES in step S907), the process proceeds to step S908. When the index i is equal to or greater than the number of devices n (NO in step S907), the process ends.

In step S908, the device management module 305 determines whether a parameter (i.e., information) that could not be transmitted to the device is implemented in the device. If the parameter is not implemented in the device, the device management module 305 excludes the task including the parameter from a recovery target. The process then proceeds to step S909. The detail process of step S908 will be described below with reference to FIG. 10.

In step S909, the device management module 305 determines whether the type of the task to be recovered is the task that transmits the information to the device. If the task is the task that transmits the information to the device (YES in step S909), the process proceeds to step S910. On the other hand, if the task is not the task that transmits the information to the device (NO in step S909), the process proceeds to step S911.

In step S910, the device management module 305 performs a process for the device that includes a security mode. The detail process performed in step S910 will be described below with reference to FIG. 11.

In step S911, the device management module 305 increments the index i. The process returns to step S907.

Figure 10:
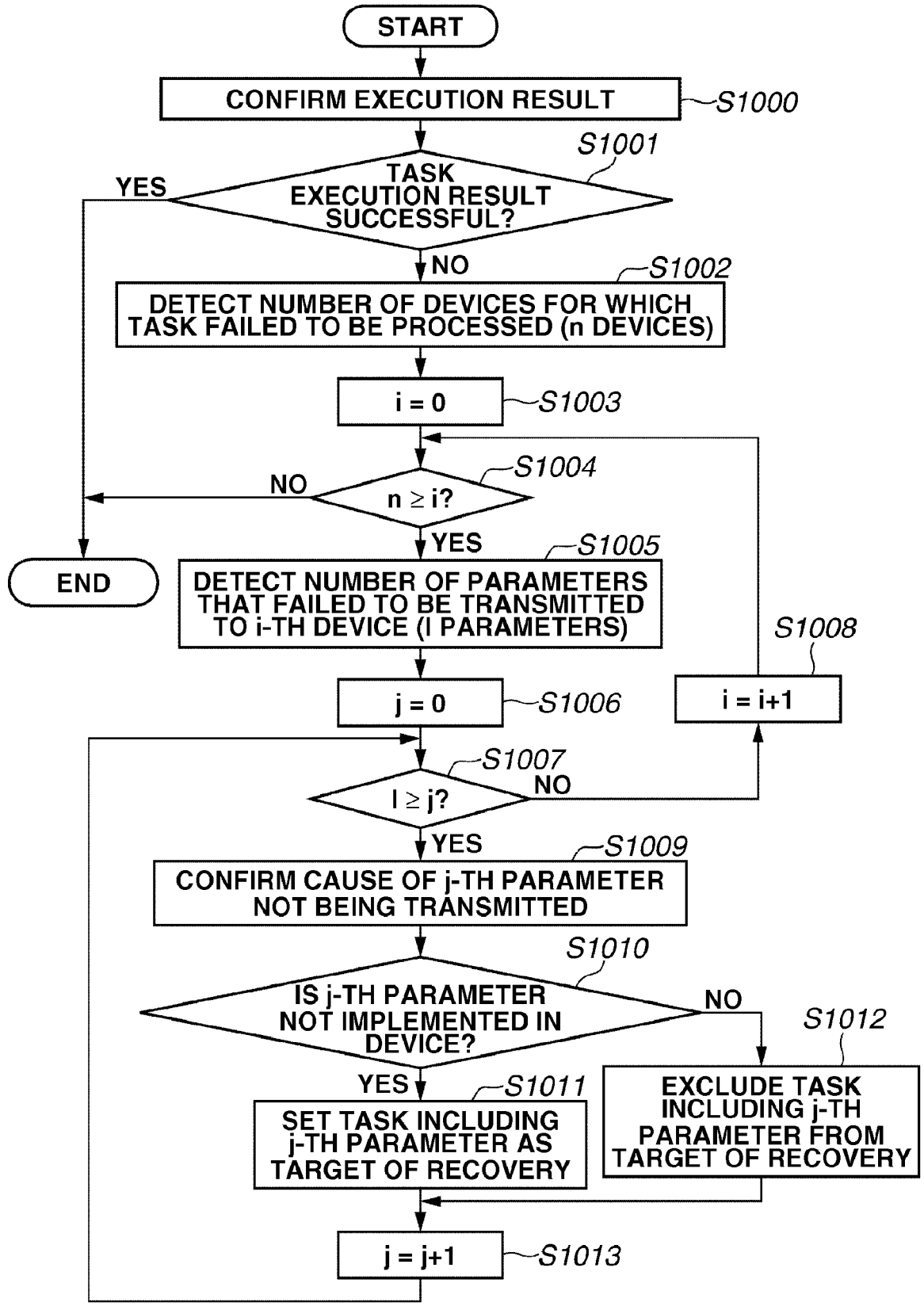
FIG. 10 is a flowchart illustrating an example of an operation performed by a network device management program when control to exclude a task that includes information not implemented in a device from a recovery target is performed according to the exemplary embodiment of the present invention.

FIG. 10 is a flowchart illustrating an example of an operation when the device management program 111 performs control to exclude the task that includes the information (parameter) not implemented in the device, from the recovery target. That is, the flowchart illustrated in FIG. 10 describes step S908 illustrated in FIG. 9.

In step S1000, the device management module 305 refers to the execution result for each task stored in the database 312 via the overall control module 300.

In step S1001, the device management module 305 determines whether the execution result of the task referred in step S1000 was successful. If the execution result of the task was successful (YES in step S1001), the process ends. On the other hand, if the execution result of the task was not successful (NO in step S1001), the process proceeds to step S1002.

In step S1002, the device management module 305 detects the number of devices on which the task failed to be processed (as n devices), based on the execution result of the task referred in step S1000, and stores the detected number of devices.

In step S1003, the device management module 305 initializes the index i for counting the number of devices on which the task failed to be processed, to 0.

In step S1004, the device management module 305 determines whether the index i is less than or equal to the number of devices (n) on which the task failed to be processed. When the index i is less than or equal to the number of devices n (YES in step S1004), the process proceeds to step S1005. On the other hand, when the index i is greater than the number of devices n (NO in step S1004), the process ends.

In step S1005, the device management module 305 detects a number of information (i.e., parameters) that failed to be transmitted to the i-th device (as one parameter).

In step S1006, the device management module 305 initializes an index j for counting the information that failed to be transmitted, to zero.

In step S1007, the device management module 305 determines whether the index j, i.e., the number of information that failed to be transmitted, is less than or equal to one. If the index j is less than or equal to one (YES in step S1007), the process proceeds to step S1009. On the other hand, if the index j is greater than one (NO in step S1007), the process proceeds to step S1008.

In step S1008, the device management module 305 increments the index i for counting the number of devices on which the task failed to be processed. The process then returns to step S1004.

In step S1009, the device management module 305 confirms a cause of failure in transmitting the j-th information (i.e., cause of non-transmission). The device management module 305 confirms the cause of failure by referring to a task execution result management table illustrated in FIG. 19B which will be described below. In the present exemplary embodiment, an example of an acquisition unit can be realized by performing the process of step S1009.

In step S1010, the device management module 305 determines whether the j-th information is information that is not implemented in the device based on the confirmation result in step S1009. That is, the device management module 305 determines whether the task can be recovered. In the present exemplary embodiment, an example of a confirmation unit can be realized by performing the process of step S1010.

When the J-th information is the information implemented in the device (YES in step S1010), the process proceeds to step S1011. On the other hand, if the j-th information is the information that is not implemented in the device (NO in step S1010), the process proceeds to step S1012.

The device management module 305 determines whether the information is implemented in the device by referring to an error status field 1402 of an SNMP v1 packet illustrated in FIG. 13 to be described below. More specifically, when NoSuchName is set to the error status field 1402 of the SNMP v1 packet received from the device as a response to information transmission, the device management module 305 can determine that the information is not implemented in the device.

In step S1011, the device management module 305 sets the task including the information determined to be implemented in the device in step S1010 as a target of the recovery task. The process then proceeds to step S1013.

On the other hand, in step S1012, the device management module 305 excludes the task including the information determined to be not implemented in the device in step S1010 from the target of the recovery task. As described above, according to the present exemplary embodiment, the task that becomes the recovery target by performing the processes of steps S1011 and S1012 is re-executed on the device on which the task failed to be processed. As a result, an example of a re-execution unit is realized.

In step S1013, the device management module 305 increments the index j for counting the information that failed to be transmitted. The process then returns to step S1007.

Figure 11:
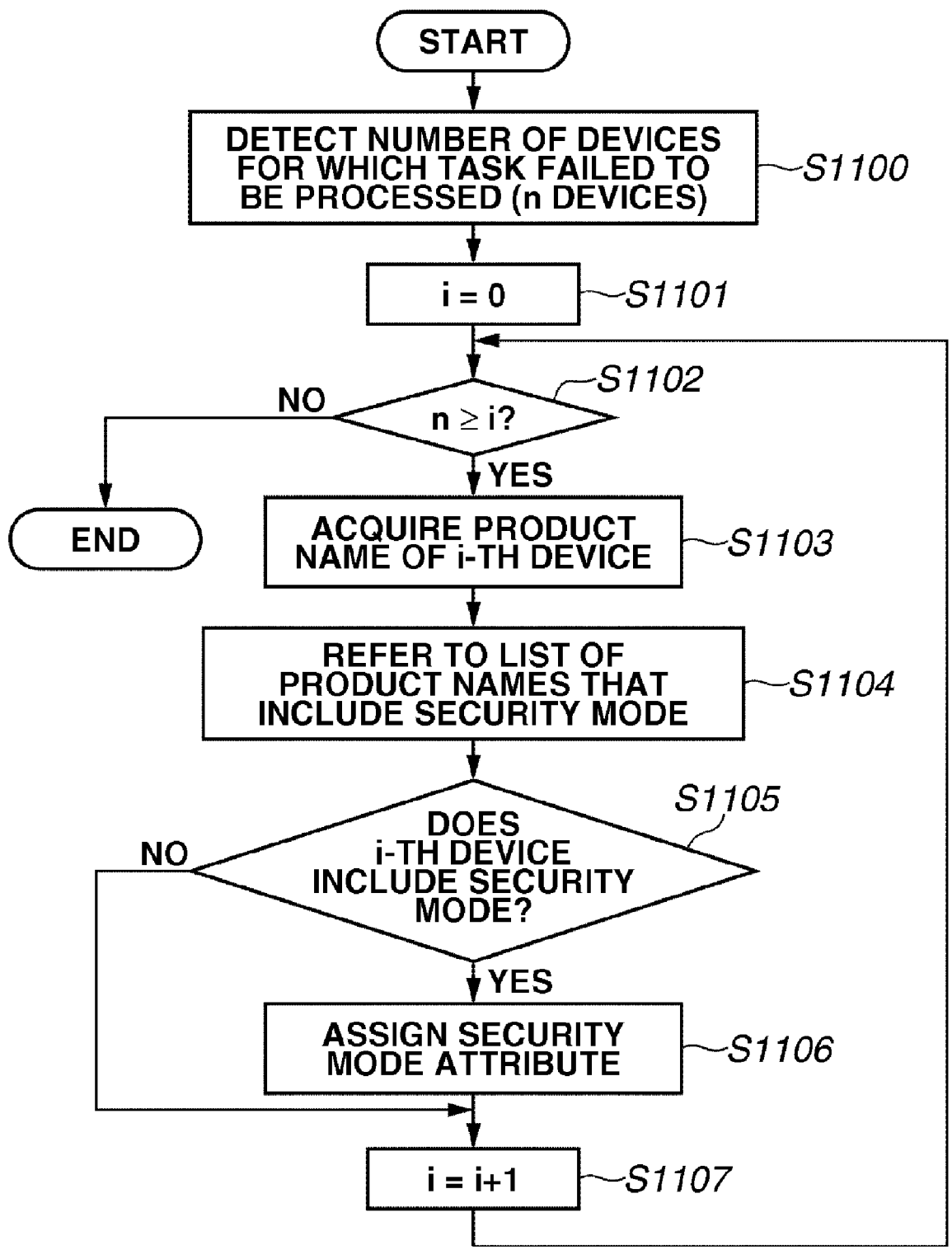
FIG. 11 is a flowchart illustrating an example of an operation performed by a network device management program when a recovery task is generated according to the exemplary embodiment of the present invention.

FIG. 11 is a flowchart illustrating an operation performed by the device management program 111 when the recovery task of the task which transmits the information to the device is generated. In particular, FIG. 11 illustrates an operation of generating the recovery task for the device that includes the security mode, and describes in detail the operation of step S910 illustrated in FIG. 9. In the present exemplary embodiment, a list of product names of devices that include a security mode is pre-stored in the database 312.

In step S1100, the device management module 305 detects the number of devices on which the information transmission task failed to be processed.

In step S1101, the device management module 305 initializes the index i for counting the number of devices on which the task failed to be processed, to zero.

In step S1102, the device management module 305 determines whether the index i is less than or equal to the number of devices n on which the task failed to be processed. If the index i is less than or equal to the number of devices n on which the task failed to be processed (YES in step S1102), the process proceeds to step S1103. On the other hand, if the index i is greater than the number of devices n (NO in step S1102), the process ends.

In step S1103, the device management module 305 acquires the product name of the i-th device.

In step S1104, the device management module 305 refers to the list of product names that includes a security mode stored in the database 312 to determine whether the i-th device includes the security mode.

In step S1105, the device management module 305 determines whether the i-th device includes the security mode. More specifically, the device management module 305 confirms whether the product name acquired in step S1103 is contained in the list of product names including the security mode referred in step S1104. If the i-th device includes the security mode (YES in step S1105), the process proceeds to step S1106. On the other hand, if the i-th device does not include the security mode (NO in step S1105), the process proceeds to step S1107.

In step S1106, the device management module 305 assigns a security mode attribute to the i-th device. The process then proceeds to step S1107. The security mode attribute indicates that the device includes the security mode.

In step S1107, the device management module 305 increments the index i. The process then returns to step S1102.

Figure 12:
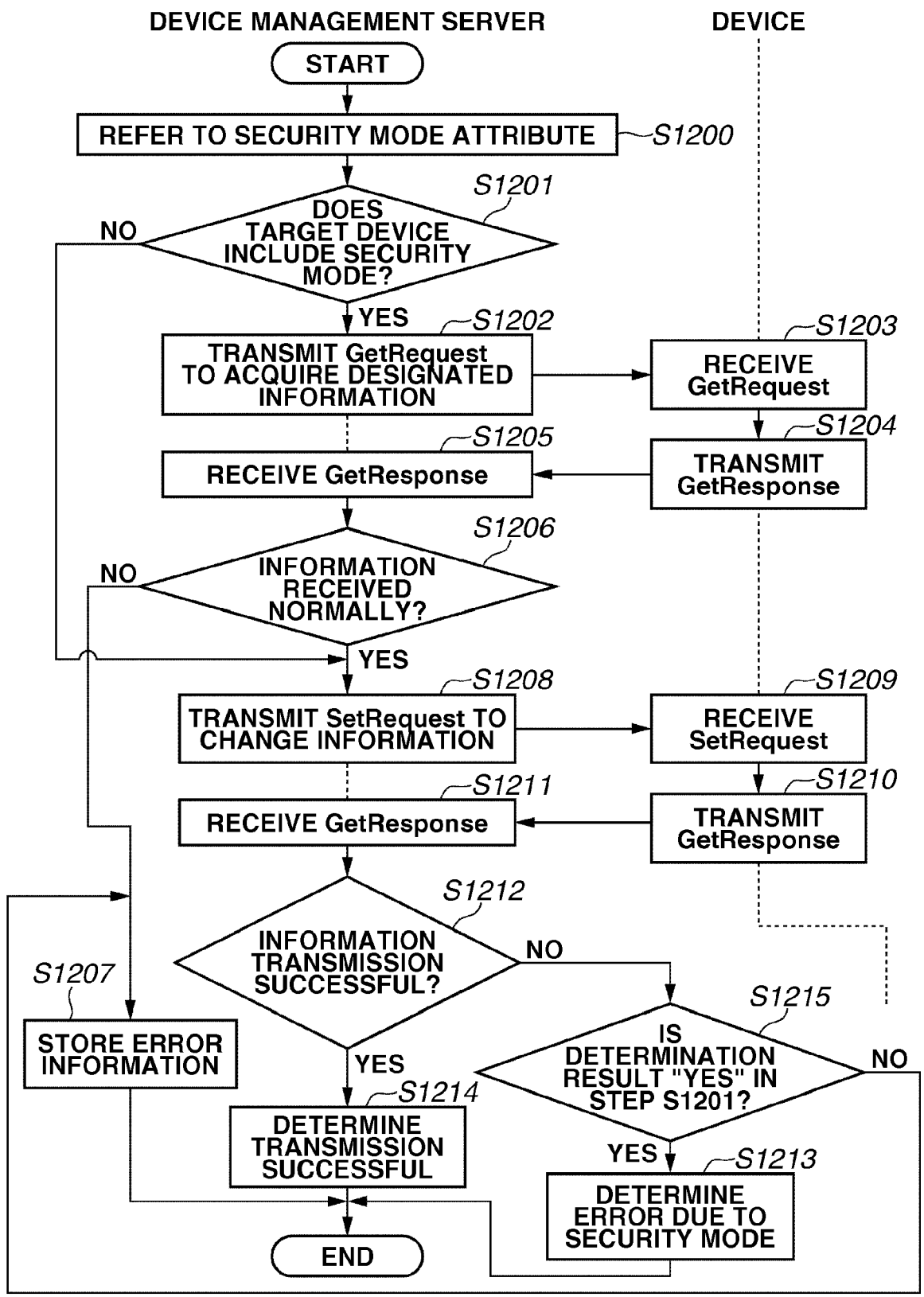
FIG. 12 is a flowchart illustrating an example of an operation performed by a network device management system when a recovery task is generated according to the exemplary embodiment of the present invention.

FIG. 12 is a flowchart illustrating an example of an operation performed by the device management system when the recovery task is executed to the device to which the security mode attribute is assigned.

FIG. 20 illustrates an example of a specification of the device of the security mode.

Referring to FIG. 20, SNMP v1 and SNMP v3 are network management protocols that are used to perform remote operation and management of network devices. The present exemplary embodiment defines SNMP v3 as the security mode.

Operations that can be performed by each of the SNMP v1 and the SNMP v3 protocols are defined for each security level. When the security level of the device is high, the device management server 110 is prohibited from operating on the device using SNMP v1. However, the device management server 110 is permitted to read the information from and write the information in a management information base (MIB) of the device using SNMP v3. When the security level is mid-level, the device management server 110 can read the information from the MIB of the device using the SNMP v1, and can read the information from and write the information in the MIB using the SNMP v3. When the security level is low, the device management server 110 can read the information from and write the information in the MIB of the device using both SNMP v1 and the SNMP v3. The device can be set at various security levels.

In step S1200 illustrated in FIG. 12, the task management module 302 refers to the information about the devices that are assigned the security mode attribute and stored in the database 312 via the operation illustrated in FIG. 11.

In step S1201, the task management module 302 determines whether the device that transmits target information includes the security mode based on a result of referring in step S1200. If the device includes the security mode (YES in step S1201), the process proceeds to step S1202. On the other hand, if the device does not include the security mode (NO in step S1201), the process proceeds to step S1208.

In step S1202, the task management module 302 performs a process to read out information that the user designated as the information to be transmitted, from the device (e.g., the multifunctional device 140), on the device setting editing screen illustrated in FIG. 6. More specifically, the SNMP module 311 transmits a GetRequest packet to the device.

In step S1203, the device receives the GetRequest packet that the SNMP module 311 transmitted in step S1202.

In step S1204, the device notifies the device management server 110 of a value of an MIB object designated by the user in response to the GetRequest packet. The notification is made by transmitting a GetResponse packet from the device to the device management server 110.

In step S1205, the SNMP module 311 receives the GetResponse packet transmitted by the device in step S1204.

As described above, according to the present exemplary embodiment, an example of a reading unit is realized by executing the processes of steps S1202, S1203, S1204, and S1205.

In step S1206, the SNMP module 311 analyzes the GetResponse packet received in step S1205 and confirms an error status field in the packet. The SNMP module 311 can determine by the confirmation whether the information from the device has been normally received.

The SNMP v1 packet will be described below in detail with reference to FIG. 13. FIG. 13 illustrates an example of a configuration of the SNMP v1 packet.

Figure 13:
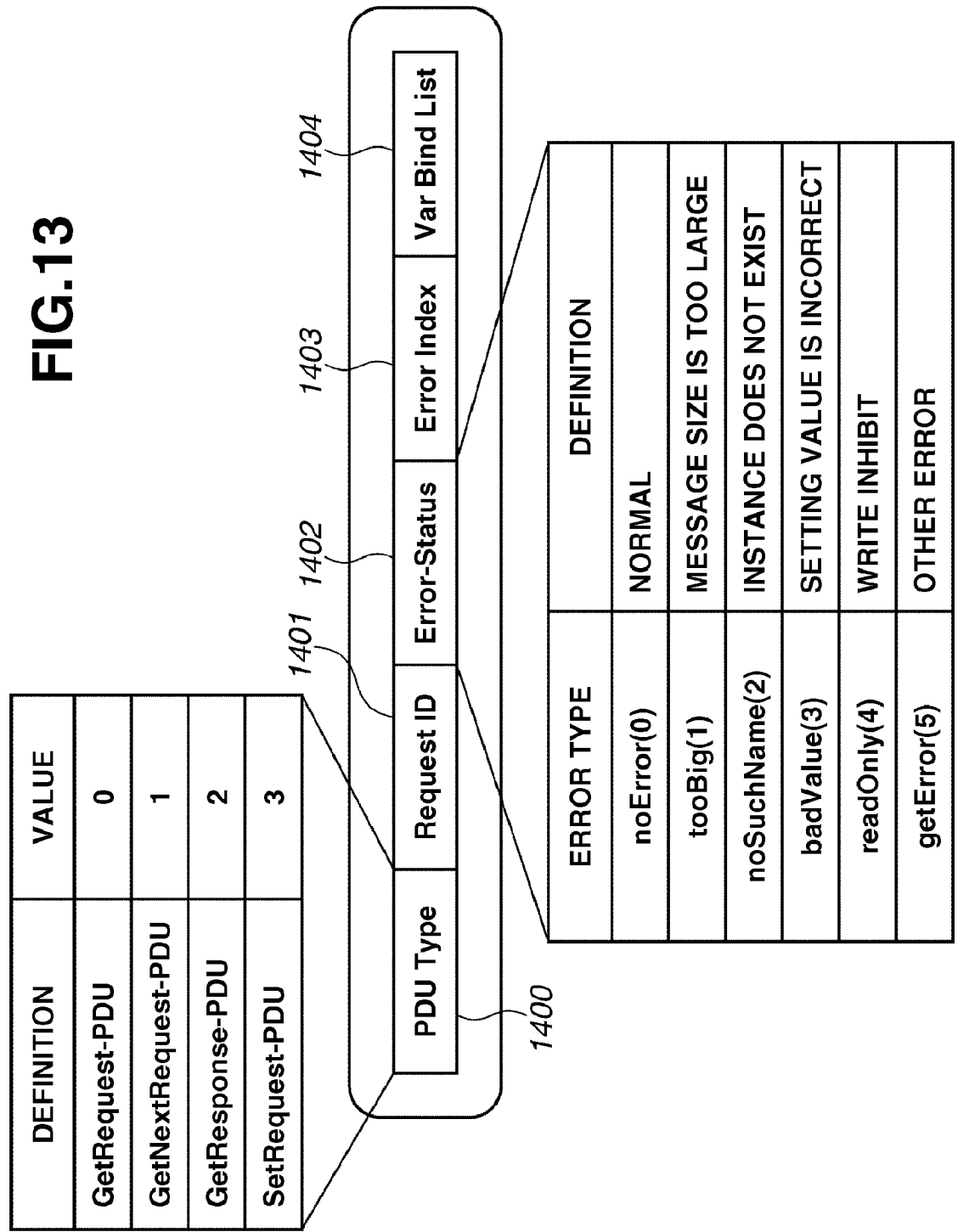
FIG. 13 illustrates an example of a configuration of a simple network management protocol (SNMP) v1 packet according to the exemplary embodiment of the present invention.

Referring to FIG. 13, a value corresponding to a protocol data unit (PDU) type is set to a field 1400. More specifically, "0" for GetRequest, "1" for GetNextRequest, "2" for GetResponse, and "3" for SetRequest are set to the field 1400.

A request identifier (ID) is stored in a field 1401. The request identifier is a value for uniquely identifying a request packet and a response packet of SNMP.

The error status is stored in the field 1402. In a case of SNMP v1, five statuses are defined as the error statuses. Among the error statuses, NoSuchName is a response made when the requested MIB information is not implemented in the device. In the present exemplary embodiment, NoSuchName is used to determine whether the information is implemented in the device.

An error index is stored in a field 1403. The error index is information for identifying the MIB object in which an error has occurred.

Management information is stored in a field 1404. A plurality of MIB objects and values thereof are stored in the field 1404.

In step S1206 illustrated in FIG. 12, the SNMP module 311 determines whether the information is normally received from the device by confirming the error status field 1402. If the SNMP module 311 determines that information has not been normally received from the device, i.e., information acquisition from the device has failed (NO in step S1206), the process proceeds to step S1207. On the other hand, if the SNMP module 311 determines that information has been received from the device without error, i.e., the information acquisition from the device succeeded (YES in step S1206), the process proceeds to step S1208.

In step S1207, the task management module 302 stores error information according to the detection result acquired in step S1206 in the database 312. The process then ends.

In step S1208, the SNMP module 311 transmits a SetRequest packet to the device to change the information determined to have been successfully acquired in step S1206 to a value that the user has input in the device setting editing screen illustrated in FIG. 6. The process proceeds to step S1209.

In step S1209, the device receives the SetRequest packet that the SNMP module 311 transmitted in step S1208.

In step S1210, the device transmits the GetResponse packet corresponding to the SetRequest packet received in step S1209 to the device management server 110.

In step S1211, the SNMP module 311 receives the GetResponse packet transmitted by the device in step S1210.

In step S1212, the SNMP module 311 confirms the error status field 1402 of the GetResponse packet received in step S1211 to determine whether the information transmission to the device succeeded. If the SNMP module 311 determines that the information transmission failed (NO in step S1212), the process proceeds to step S1215.

All of the above-described commands such as SetRequest and GetRequest are transmitted in a non-security mode (SNMP v1).

In step S1215, the task management module 302 determines whether it is determined in step S1201 that the device to which the target information is transmitted includes the security mode (i.e., whether the determination result was "YES" in step S1201). If the determination result is "YES" in step S1201 (YES in step S1215), the process proceeds to step S1213. That is, since the device includes the security mode, it can be determined that full access to the MIB of the device is permitted in the security mode, whereas information can only be read out and not written in the MIB in the non-security mode.

On the other hand, if the determination result is "NO" in step S1201 (NO in step S1215), the process proceeds to step S1207. Since the device does not originally include the security mode, the security mode and the security level cannot be a cause of the error.

More specifically, in a case where the device on which the task is executed is as described below, the executed task is determined to have failed due to a security reason. If the device includes the security mode, and the task management module 302 fails to write the information into the MIB that is a setting value in the non-security mode, and succeeds to read the information from the MIB in the non-security mode, the executed task is determined to have failed due to the security reason.

On the other hand, if the SNMP module 311 determines that the information transmission succeeded in step S1212 (YES in step S1212), the process proceeds to step S1214. As described above, an example of a determination unit is realized by executing a process of step S1212.

In step S1213, the task management module 302 has succeeded in acquiring (reading) the information in step S1206 and failed in transmitting (writing) the information in step S1212. Consequently, the task management module 302 determines that the device is operating under the security mode. The process then ends.

In step S1214, the task management module 302 determines that the information transmission succeeded. Consequently, the task management module 302 records that the information transmission succeeded as an execution result of the task in the database 312. The process then ends.

As described above, according to the present exemplary embodiment, an example of a determination unit is realized by executing the processes of steps S1213 and S1214.

The determination results of steps S1213 and S1214 are stored in the database 312 and reflected on a message displayed in a task execution result display area 1800 which is a sub-window of a device details screen illustrated in FIG. 18 to be described below.

Figure 14:
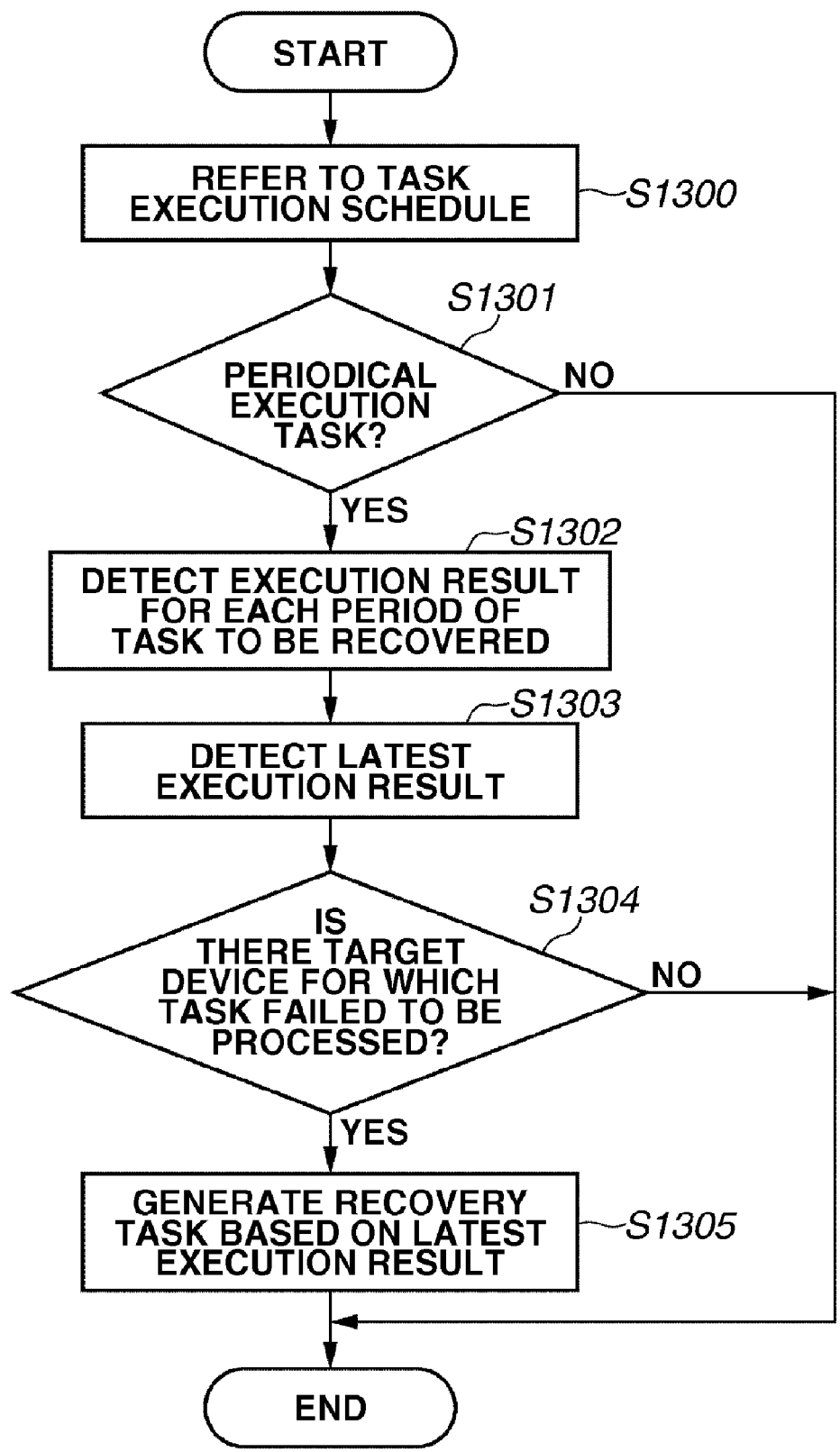
FIG. 14 is a flowchart illustrating an example of an operation performed by a network device management program when a recovery task of a periodical execution task that is repeatedly executed periodically is generated according to the exemplary embodiment of the present invention.

FIG. 14 is a flowchart illustrating an example of an operation performed by the device management program 111 when the recovery task of the periodical execution task which is periodically repeated is generated. The flowchart illustrated in FIG. 14 is a detailed description of the process flow from step S900 to step S903 illustrated in FIG. 9.

In step S1300, the task management module 302 refers to a task execution schedule stored in the database 312.

In step S1301, the task management module 302 determines whether the task to be recovered is the periodical execution task based on the task execution schedule that the task management module 302 referred in step S1300. If the task to be recovered is the periodical execution task (YES in step S1301), the process proceeds to step S1302. On the other hand, if the task to be recovered is not the periodical execution task (NO in step S1301), the process ends.

In step S1302, the task management module 302 detects execution results of tasks having the same ID as the task ID assigned to the task to be recovered when the task is registered. As a result, the task management module 302 detects the execution result for each cycle of the task to be recovered.

In step S1303, the task management module 302 compares the completion time of the execution results for each cycle detected in step S1302 and detects the latest execution result.

In step S1304, the task management module 302 refers to the task execution result and determines whether there is a target device on which the task failed to be processed. When there is the target device on which the task failed to be processed (YES in step S1304), the process proceeds to step S1305. When there is no target device on which the task failed to be processed (NO in step S1304), the process ends.

In step S1305, the task management module 302 generates the recovery task based on the latest execution result of the periodical execution task. The process then ends. As described above, according to the present exemplary embodiment, an example of a generation unit is realized by executing the process of step S1305.

FIG. 15 illustrates an example of a registered task list screen. The registered task list screen is generated by the task management module 302 by controlling the registered task list module 303.

Referring to FIG. 15, a registered task information list display portion 1500 displays a list of all registered task information generated by the device management module 305 and the device search module 308 and stored in the database 312.

A task name display portion 1501 displays the task name that the user inputs in the task setting input portion 800 of the task registration setting screen illustrated in FIG. 7. When the user presses an "edit>>" link that is displayed in the task name display portion 1501, the device selection screen illustrated in FIG. 5 is displayed. The device that is selected when the task is created is already selected in the initial device selection screen displayed by pressing the "edit>>" link.

As described above, the user can select either one of the device setting transmission task or the device setting acquisition task in the device management program 111 according to the present exemplary embodiment. Therefore, a function name display portion 1502 displays either "device setting transmission" or "device setting acquisition".

A registering person portion 1503 displays a name of a user who created the task among users managed by the user management module 310.

An execution date and time display portion 1504 displays a date and time when the scheduler module 301 activated the task, or a date and time when the task will be activated.

An execution status display portion 1505 displays "waiting to be executed", "executed", and "suspended" according to the registered status of the task.

FIG. 16 illustrates an example of an executed task list screen. The execution task list screen is generated by the task management module 302 by controlling the execution task list module 304.

Referring to FIG. 16, an executed task information list display portion 1600 displays a list of tasks that are executed or being executed among tasks generated by the device setting acquisition module 306 or the device setting transmission module 307.

A task name display portion 1601 displays the task name that the user has input in the task setting input portion 800 of the task registration setting screen illustrated in FIG. 7.

An execution status display portion 1602 displays a character string indicating an execution status such as "executing", "cancelled", "normal end", and "error", according to the execution status of the task. A link is provided to the character string indicating the execution status displayed in the execution status display portion 1602. When the user presses the link, a screen displaying details of the executed task illustrated in FIG. 17 is displayed in a sub-window.

Further, when the character string indicating the execution status is the "error", a "recovery>>" link is displayed on the right side of the execution status display portion 1602. If the user presses the "recovery>>" link, the device selection screen illustrated in FIG. 5 is displayed. The device which becomes the recovery target via the process illustrated in FIG. 9 among the devices on which the task failed to be processed is already selected in the initial device selection screen displayed by the user pressing the "recovery>>" link.

As described above, the user can select either one of the device setting transmission task or the device setting acquisition task in the device management program 111 according to the present exemplary embodiment. Therefore, a function name display portion 1603 displays either "device setting transmission" or "device setting acquisition".

A registering person display portion 1604 displays a name of a user who created the task among the users managed by the user management module 310.

An execution date and time display portion 1605 displays the date and time when the scheduler module 301 activated the task.

FIG. 17 illustrates an example of an executed task details screen. When the user presses the character string indicating the execution status in the execution status display portion 1602 of the executed task list screen illustrated in FIG. 16, the executed task details screen is displayed in a sub-window.

Referring to FIG. 17, a task execution result display area 1700 displays an execution result of an entire task.

A task information display portion 1701 displays the task name and the comment that the user inputs in the task setting input portion 800 of the task registration setting screen illustrated in FIG. 7. The task information display portion 1701 further displays a registering person, execution start date and time, and execution end date and time of the task.

A target device execution status display portion 1702 displays a list of execution statuses of each of the devices on which the task is executed.

The target device execution status display portion 1702 displays a device name, a product name, an installation location, an IP address, and a MAC address of each target device. Further, a device unit execution status display portion 1703 in the target device execution status display portion 1702 displays the execution status of the task for each device, such as "not executed", "executing", "normal end", and "error".

A link is provided to a character string indicating the execution status displayed in the device unit execution status display portion 1703. If the user presses the link, a details screen of an individual device illustrated in FIG. 18 is displayed in a sub-window.

Figure 18:
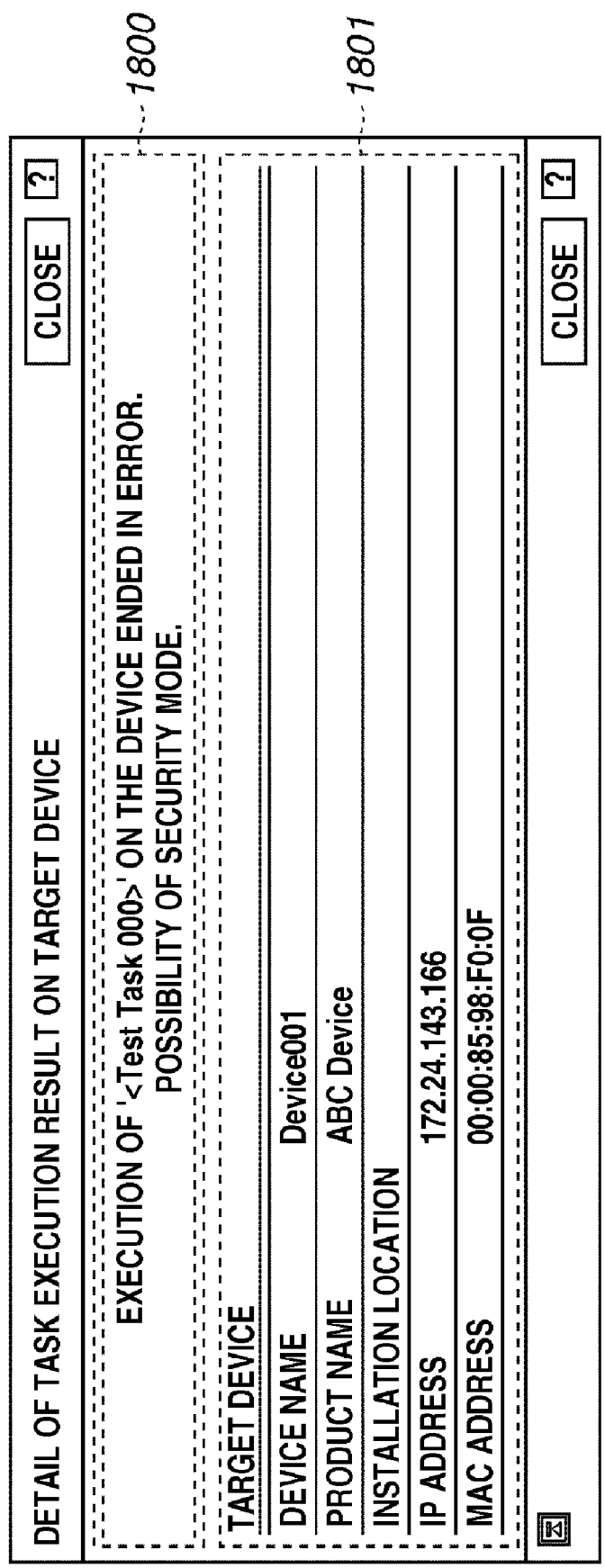
FIG. 18 illustrates an example of details screen of an individual device according to the exemplary embodiment of the present invention.

FIG. 18 illustrates an example of the details screen of the individual device. When the character string indicating the execution status displayed in the device unit execution status display portion 1703 in the executed task details screen as illustrated in FIG. 17 is pressed, the details screen of the individual device as illustrated in FIG. 18 is displayed in the sub-window.

Referring to FIG. 18, a task execution result display area 1800 displays an execution result of a task for each device.

A device information display portion 1801 displays information about the device such as a device name, a product name, an installation location, an IP address, and a MAC address.

Further, acquisition information (not illustrated) is displayed in detail on the device details screen in a case where information is acquired from the device.

FIGS. 19A and 19B illustrate examples of data tables which are generated by the device management program 111 when the task is executed.

FIG. 19A illustrates an example of an executed task table which is generated when the scheduler module 301 activates the task that the device management module 305 registered via the task management module 302. The executed task table illustrated in FIG. 19A includes a task ID 1900, an executed task ID 1901, a task execution result 1902, task start date and time 1903, and task end date and time 1904.

Identifiers registered in the task ID 1900 is the same as those registered in the task ID 503 in the registered task table illustrated in FIG. 8. The executed task ID 1901 is an identifier which is assigned to the task ID 1900 when the task is executed. In a case of the periodical execution task, the executed task ID 1901 is assigned for each cycle to the same task ID 1900.

The execution result of each task is registered in the task execution result 1902. The execution status display portion 1602 in the execution task list screen illustrated in FIG. 16 displays the content of the task execution result 1902.

FIG. 19B illustrates an example of a task execution result management table. The task execution result management table stores information for managing the execution result of the task for each device.

In the task execution result management table illustrated in FIG. 19B, an execution task ID 1905 is the same as the execution task ID 1901 in the executed task table illustrated in FIG. 19A. Further, a device ID 1906 is the same as the device ID 513 in the target device management task table illustrated in FIG. 8C.

Execution results of each of the devices are registered in a device unit execution result 1907. The device unit execution status display portion 1703 illustrated in FIG. 17 displays the content of the device unit execution result 1907.

Data that are transmitted to the device (or acquired from the device) by executing the task are registered in "data 1" 1908 and "data 2" 1910. For example, when data that is not implemented in the device is transmitted, information indicating "not implemented" is stored in the "data 1" 1908 and the "data 2" 1910.

Execution results are registered in "execution result of each task for data 1" 1909 and "execution result of each task for data 2" 1911 by a unit of information transmitted by the task.

As described above, according to the present exemplary embodiment of the present invention, the task execution apparatus collectively executes the task on a plurality of devices. The task execution apparatus then detects the device on which an execution of the task failed and acquires the cause of the failure. The task execution apparatus determines whether to re-execute the task on the detected device based on the cause of failure. The task execution apparatus re-executes the task only when the task execution apparatus determines that the task is to be re-executed. As a result, the task execution apparatus can exclude the task including information that always fails to be transmitted from the target to be re-executed. Therefore, re-transmission of unnecessary information can be prevented when the task execution apparatus re-transmits information which has been collectively transmitted to a plurality of devices, to the device on which the information transmission failed.

Further, according to the present exemplary embodiment, a task to be re-executed is generated based on a latest execution result for the periodical execution task that is periodically repeated. As a result, the task can be more efficiently re-executed.

Further, according to the present exemplary embodiment, the task execution apparatus previously stores information about a security mode device that includes the security mode in which information can be acquired (read out) but not transmitted (written). When the task is re-executed to the device including the security mode, the task execution apparatus determines whether the information is normally received from the device including the security mode. If the information has been normally received, the task execution apparatus transmits the information and determines whether the information has been normally transmitted. When the information has not been normally transmitted, the task execution apparatus determines that the execution of the task failed due to the device including the security mode. Therefore, the user can be notified of a failure in executing the task (the information transmission) because the device operates under the security mode.

Each unit included in the task execution apparatus and each step included in the task execution method in the above-described exemplary embodiment of the present invention can be realized by executing a program stored in a RAM of a computer or a ROM. Such a program and a computer-readable storage medium that stores the program constitute the present invention.

Further, the present invention can be realized as a system, an apparatus, a method, a program, or a storage medium. More specifically, the present invention can be applied to a system including a plurality of devices, or to an apparatus including a single device.

The present invention can also be achieved by directly or remotely providing a storage medium which stores software (program code) for implementing functions of the above-described exemplary embodiments (i.e., programs corresponding to flowcharts illustrated in FIGS. 4, 9, 10, 11, 12, and 14), to a system or an apparatus. The program code stored in the storage medium can be read and executed by a computer (central processing unit (CPU) or micro-processing unit (MPU)) of the system or the apparatus.

In this case, the software (program code) which is installed to the computer for realizing the functions of the above-described exemplary embodiments and the storage medium which stores the software (program code) constitute the present invention.

A computer executable program to implement the above-mentioned exemplary embodiments can take any form readable by computer, for example, an object code, a program executed by an interpreter, or script data supplied to an operating system (OS).

The storage medium can be, for example, a floppy disk, a hard disk, a magneto-optical disk (MO), a compact disc-read-only memory (CD-ROM), a CD-recordable (CD-R), a CD-rewritable (CD-RW), a magnetic tape, a nonvolatile memory card, a ROM, or a digital versatile disc (DVD, DVD-ROM, and DVD-R).

The software (program code) can also be supplied to the system or the apparatus by accessing a web page on the Internet through the browser of a client computer. The software (program code) itself or a compressed file including an auto-install function can be downloaded from the web page to the storage medium such as a hard disk. In addition, the program code can be divided into a plurality of files, and each file can be downloaded from different web pages. Namely, the present invention can be applied to a World Wide Web (WWW) server that allow numerous users to download the program files so that the functions and processes of the present invention can be realized on the computers.

The software (program code) can be encrypted and stored in the storage medium, such as a CD-ROM, to be distributed to users. A user who satisfies given conditions can download key information for decrypting the program from a web page through the Internet. By using the key information, the encrypted program can be executed and installed in a computer to realize the functions of the present invention.

The above-described exemplary embodiments can be not only realized by executing software (program code) read by a CPU. An operating system (OS) or the like working on a computer can also perform a part or the whole of processes according to instructions of the software (program code) and realize functions of the above-described exemplary embodiments.

The software (program code) read from the storage medium can be stored in a memory equipped in a function expansion board inserted in a computer or a function expansion unit connected to a computer, and a CPU in the function expansion board or the function expansion unit can execute a part or the whole processes according to the instructions of the software (program code) to realize the functions of the above-described exemplary embodiments.

The present exemplary embodiment described an example in which the task is either one of the device setting transmission task or the device setting acquiring task. However, the task in the present invention is not limited to the above-described tasks.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-333061 filed Dec. 25, 2007 which is hereby incorporated by reference herein in its entirety.

What is claimed is:

1. A task execution apparatus including at least one processor and a memory communicatively-coupled via a bus that communicates with a device and executes a task to perform remote control of the device, the task execution apparatus comprising:

an execution unit configured to execute the task on a plurality of devices;

an acquisition unit configured to acquire a cause of failure in execution by the execution unit, wherein the acquisition unit determines that the task executed by the execution unit failed due to a security reason in a case where the device that is an operation target of the task executed by the execution unit supports a security mode, fails to write a setting value in a non-security mode, and succeeds to read the setting value in the non-security mode;

a confirmation unit configured to confirm that each device of the plurality of devices on which the execution unit failed to execute the task does not support the task executed by the execution unit based on the cause acquired by the acquisition unit; and a re-execution unit configured to re-execute the task on each of the plurality of devices on which the execution unit failed to execute the task, wherein the re-execution unit excludes each of the plurality of devices from a re-execution target of the task, in a case where the confirmation unit confirms that each of the plurality of devices does not support the task executed by the execution unit.

2. The task execution apparatus according to claim 1, further comprising, a generation unit configured to generate a task that is re-executed by the re-execution unit based on a latest execution result among execution results of the task in a case where the task is of the type that repeats according to a set period, wherein the re-execution unit re-executes the task generated by the generation unit on each of the plurality of devices that the execution unit failed to execute the task.

3. The task execution apparatus according to claim 1, further comprising: in a case where the task executed by the execution unit is information transmission and each of the plurality of devices to which the execution unit failed to transmit information is a predetermined device, a reading unit configured to read, from the execution unit, the information transmitted to the each of the plurality of devices;

a first determination unit configured to determine whether the re-execution unit successfully re-transmitted the information to each of the plurality of devices to which the information transmission failed after the reading unit normally read the information; and a second determination unit configured to determine that the task failed because the device to which the information transmission failed supports a mode in which the information can be read but cannot be written when the first determination unit determines that the information could not be re-transmitted.

4. A method for executing a task to perform remote control of a device, comprising:

executing the task on a plurality of devices;

acquiring a cause of failure in execution of the task;

confirming that each of the plurality of devices on which the task failed to be executed does not support the executed task based on the acquired cause;

re-executing the task on each of the plurality of devices on which the task failed to be executed;

determining that the executed task failed due to a security reason in a case where each of the plurality of devices that is an operation target of the executed task supports a security mode, fails to write a setting value in a non-security mode, and succeeds to read the setting value in the non-security mode; and excluding each of the plurality of devices from a re-execution target of the task, in a case where it is confirmed that each of the plurality of devices that failed to execute the task is not a device that supports the executed task.

5. The method according to claim 4, further comprising:

generating a task that is re-executed based on a latest execution result among execution results of the task in a case where the task is of the type that repeats according to a set period; and re-executing the generated task on each of the plurality of devices on which the task failed to be executed.

6. The method according to claim 4, further comprising:

in a case where the executed task is information transmission and, each of the plurality of devices to which information transmission failed is a predetermined device, reading information that failed to be transmitted;

determining whether the read information has been re-transmitted to each of the plurality of devices on which information transmission failed after the information is normally read; and determining that task failed because each of the plurality of devices to which the information transmission failed supports a mode in which the information can be read but cannot be written, when it is determined that the information could not be re-transmitted.

7. A computer-readable storage medium storing a computer-executable process, the computer-executable process causing a computer to implement the method of claim 4.

* * * * *